United States Patent
Taniguchi et al.

(10) Patent No.: US 7,755,737 B2
(45) Date of Patent: Jul. 13, 2010

(54) LIQUID CRYSTAL PANEL AND METHOD OF MANUFACTURING THE SAME

(75) Inventors: Yoji Taniguchi, Kawasaki (JP); Yuji Nakahata, Kumamoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 619 days.

(21) Appl. No.: 11/441,778

(22) Filed: May 26, 2006

(65) Prior Publication Data

US 2006/0215070 A1 Sep. 28, 2006

Related U.S. Application Data

(62) Division of application No. 10/806,079, filed on Mar. 22, 2004, now abandoned.

(30) Foreign Application Priority Data

Mar. 28, 2003 (JP) .............................. 2003-090753

(51) Int. Cl.
G02F 1/1335 (2006.01)
(52) U.S. Cl. .......................... 349/156; 349/155; 349/106
(58) Field of Classification Search ......... 349/155–157, 349/106, 43
See application file for complete search history.

(56) References Cited

U.S. PATENT DOCUMENTS

| | | | | |
|---|---|---|---|---|
| 5,877,832 A * | 3/1999 | Shimada | ...................... | 349/138 |
| 5,917,572 A | 6/1999 | Kurauchi et al. | | |
| 6,323,921 B1 * | 11/2001 | Kurauchi et al. | ............. | 349/106 |
| 6,570,639 B1 * | 5/2003 | Manabe et al. | .............. | 349/190 |
| 6,856,360 B1 * | 2/2005 | Higuchi et al. | ................. | 349/43 |
| 6,870,592 B1 * | 3/2005 | Yamamoto et al. | ........... | 349/155 |
| 7,286,204 B2 * | 10/2007 | Yang et al. | ................... | 349/155 |
| 7,330,234 B2 * | 2/2008 | Murakami et al. | ........... | 349/155 |
| 7,538,850 B2 * | 5/2009 | Kim et al. | .................... | 349/155 |
| 2001/0026347 A1 * | 10/2001 | Sawasaki et al. | ............ | 349/156 |
| 2002/0008819 A1 * | 1/2002 | Yoshida | ....................... | 349/138 |
| 2002/0149728 A1 | 10/2002 | Ogishima et al. | | |
| 2003/0214621 A1 * | 11/2003 | Kim et al. | .................... | 349/155 |

(Continued)

FOREIGN PATENT DOCUMENTS

JP 09-304793 11/1997

(Continued)

*Primary Examiner*—David Nelms
*Assistant Examiner*—Thanh-Nhan P Nguyen
(74) *Attorney, Agent, or Firm*—Greer, Burns & Crain, Ltd.

(57) ABSTRACT

There is provided a liquid crystal panel capable of maintaining a cell gap and preventing generation of air bubbles. In the liquid crystal panel having a liquid crystal layer sandwiched between a color filter (CF) substrate and a thin film transistor (TFT) substrate, recesses formed at respective locations of contact holes each for connecting a drain metal layer and a pixel electrode to each other are filled with respective hole-filling columnar layers. At the same time, the cell gap between the CF substrate and the TFT substrate is maintained by cell gap-maintaining columnar layers. The columnar layers are simultaneously formed by subjecting a photosensitive resin to exposure and development. As a result, a reliable liquid crystal panel which does not suffer from air bubbles remaining in the recesses formed at the locations of the contact holes, and capable of effectively maintaining the cell gap with high productivity at low costs.

10 Claims, 11 Drawing Sheets

U.S. PATENT DOCUMENTS

2004/0189928 A1 9/2004 Yang et al.
2007/0126973 A1* 6/2007 Ikeda et al. .................. 349/155

FOREIGN PATENT DOCUMENTS

| | | |
|---|---|---|
| JP | 10-096955 | 4/1998 |
| JP | 10-325964 | 12/1998 |
| JP | 11-052419 | 2/1999 |
| JP | 11-258589 | 9/1999 |
| JP | 2001-5006 | 1/2001 |
| JP | 2001-201750 | 7/2001 |
| JP | 2002-014373 | 1/2002 |
| JP | 2002-169166 | 6/2002 |
| JP | 2002-214622 | 7/2002 |
| JP | 2002-341332 | 11/2002 |
| JP | 2004-245952 | 9/2004 |

* cited by examiner

LIQUID CRYSTAL PANEL AND METHOD OF MANUFACTURING THE SAME

This is a Divisional of application Ser. No. 10/806,079, filed Mar. 22, 2004 now abandoned.

BACKGROUND OF THE INVENTION (1) Field of the Invention

This invention relates to a liquid crystal panel and a method of manufacturing the same, and more particularly to a liquid crystal panel having a structure in which recesses formed at respective locations of contact holes each for making contact between a pixel electrode on a TFT (Thin Film Transistor) substrate and a TFT are filled with a resin or the like, and a method of manufacturing the same.

(2) Description of the Related Art

A liquid crystal panel mounted in a liquid crystal display device has a structure in which a liquid crystal layer is sandwiched between a TFT substrate mainly formed with pixel electrodes, TFTs for driving pixel electrodes, and bus lines, and a counter substrate, such as a CF substrate, mainly formed with pixel electrodes and color filters (CFs), with polarizing plates bonded to the substrates. Recently, a liquid crystal panel of this kind is produced by forming a flatting layer of a resin having a thickness of approximately 4 µm to shield the influence of a lateral electric field due to bus lines, thereby realizing a high aperture ratio of the panel.

The flatting layer is formed with deep contact holes each for making contact between a pixel electrode and a TFT. After the TFTs and the flatting layer are formed in the mentioned order, the contact holes reaching the TFTs are formed. Then, a transparent conductive film layer, forming a pixel electrode, is formed on a surface of the flatting layer, a wall surface of each contact hole, and a drain electrode of the associated TFT, whereby the pixel electrode and the TFT are caused to make contact with each other. This makes the depth of the contact holes equal to the thickness of the flatting layer, and after formation of the pixel electrodes, relatively deep recesses remain as formed in the TFT substrate at the locations of the contact holes. It is preferable that the recesses are formed to have a minimized diameter so as to prevent the aperture ratio of the liquid crystal panel from being lowered. Normally, the contact holes are formed to have a diameter of approximately 5 µm.

As described above, the small and deep contact holes having a diameter of 5 µm and a depth of 4 µm are formed in the TFT substrate, and after the pixel electrodes are formed in the contact holes, the recesses are formed at the respective locations of the contact holes. It is difficult for the liquid crystal filled between the recess and the CF substrate to enter the recesses. As a consequence, some of these recesses are left behind as vacuum areas, or gasses in the recesses are moved to the liquid crystal layer to thereby cause faulty display of the liquid crystal panel. Further, when strong pressure is partially applied to the liquid crystal panel from outside, the cell gap of a liquid crystal cell is changed to temporarily generate vacuum areas and air bubbles, but these vacuum areas and air bubbles are normally extinguished as soon as the application of the pressure stops. However, if small and deep contact holes as described above exist, the air bubbles can remain in the recesses, whereby faulty display of the liquid crystal panel can be caused.

To cope with the above problems, there have been conventionally proposed various methods, including a method of filling recesses remaining at respective locations of contact holes after formation of pixel electrodes, with an insulating film, a method of forming columnar spacers in the recesses so as to maintain the cell gap (see e.g. Japanese Unexamined Patent Publication (Kokai) No. H09-304793 and No. 2002-169166).

However, to fill recesses remaining at the locations of contact holes after formation of pixel electrodes in the contact holes, with an insulating film, it is necessary to provide a photolithography step of forming the insulating film, and further a flatting step of flatting the formed insulating film, which causes increases in the number of steps and costs.

Further, if columnar spacers for maintaining the cell gap are formed in recesses existing in all the pixel areas, the degree of freedom of the positional relationship between the TFT substrate and the CF substrate is lost to lose flexibility to an impact, whereby the liquid crystal panel is made trouble-prone. Further, since the degree of freedom of the positional relationship between the TFT substrate and the CF substrate is lost, vacuum areas and air bubbles tend to occur in the liquid crystal panel by a volume change of liquid crystal caused by a change in environmental temperature conditions, whereby faulty display of the liquid crystal panel is made liable to occur. To overcome this problem, the columnar spacers are arranged at predetermined space intervals such that optimum density of columnar layers is attained in the liquid crystal panel. In this case, however, bubbles can still occur in recesses having no columnar spacers formed therein.

Further, if the step of filling recesses and the step of forming columnar spacers are carried out as separate steps, the number of steps required for manufacturing the liquid crystal panel is increased, whereby productivity thereof is largely reduced.

SUMMARY OF THE INVENTION

The present invention has been made in view of the above described points, and an object thereof is to provide a liquid crystal panel capable of effectively maintaining a cell gap between a TFT substrate and a counter substrate and at the same time preventing air bubbles or the like from remaining in recesses of the TFT substrate, and a method of manufacturing the liquid crystal panel.

To attain the above object, in a first aspect of the invention, there is provided a liquid crystal panel including a thin film transistor substrate formed with thin film transistors for driving pixel electrodes, a counter substrate provided in a manner opposed to the thin film transistor substrate, and a liquid crystal layer sandwiched between the thin film transistor substrate and the counter substrate. This liquid crystal panel is characterized by comprising hole-filling columnar layer portions for filling recesses produced by forming the pixel electrodes in contact holes each formed for connecting each of the thin film transistors and an associated one of the pixel electrodes to each other, and cell gap-maintaining columnar layer portions for maintaining a cell gap between the thin film transistor substrate and the counter substrate.

To attain the above object, in a second aspect of the invention, there is provided a method of manufacturing a liquid crystal panel including a thin film transistor substrate formed with thin film transistors for driving pixel electrodes, a counter substrate provided in a manner opposed to the thin film transistor substrate, and a liquid crystal layer sandwiched between the thin film transistor substrate and the counter substrate. This method of manufacturing a liquid crystal panel is characterized by comprising the step of simultaneously forming hole-filling columnar layer portions for filling recesses produced by forming the pixel electrodes in contact holes each formed for connecting each of the thin film transistors and an associated one of the pixel electrodes to each other, and cell gap-maintaining columnar layer portions for maintaining a cell gap between the thin film transistor substrate and the counter substrate.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The present invention will now be described in detail with reference to the accompanying drawings showing preferred embodiments thereof.

First, a description will be given of a first embodiment.

Figure 1:
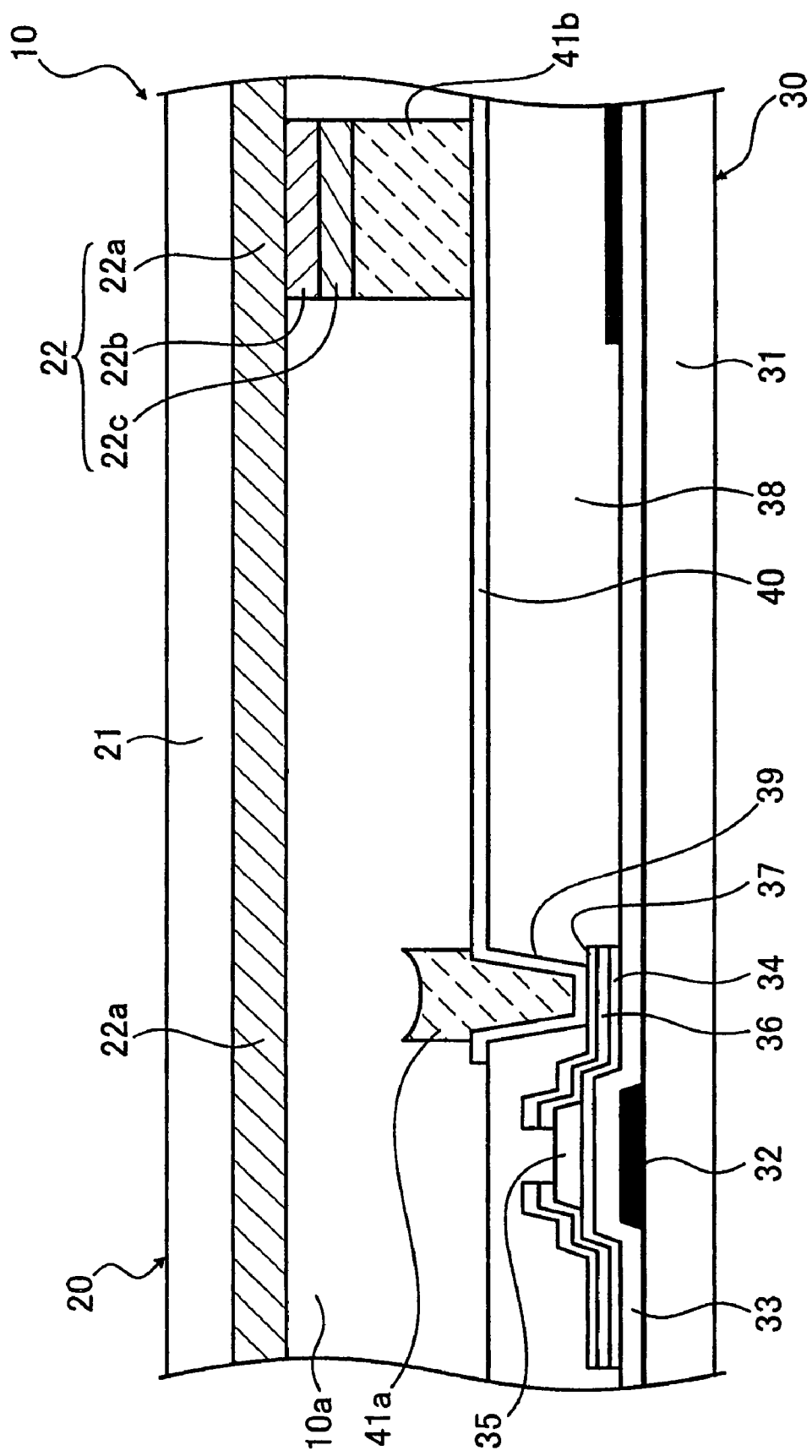
FIG. 1 is a cross-sectional view of essential elements of a liquid crystal panel according to a first embodiment of the present invention.

FIG. 1 is a cross-sectional view of essential elements of a liquid crystal panel according to the first embodiment. It should be noted that FIG. 1 shows only part of the liquid crystal panel, corresponding to one pixel.

The liquid crystal panel 10 according to the first embodiment includes a CF (Color Filter) substrate 20 and a TFT (Thin Film Transistor) substrate 30 disposed in a manner opposed to each other. Sandwiched between the substrates 20 and 30 is a liquid crystal layer 10a. Further, polarizing plates, not shown, are bonded to respective outer surfaces of the CF substrate 20 and the TFT substrate 30. Thus, the liquid crystal panel 10 is constructed.

The CF substrate 20 includes a glass substrate 21 made e.g. of no-alkali glass, and a CF layer 22a made of a resin (red resin) having a red color, a resin (green resin) having a green color, or a resin (blue resin) having a blue color, which is formed on a surface of the glass substrate 21 opposed to the TFT substrate 30. Further, on the CF layer 22a are partially provided CF layers 22b and 22c formed one upon the other, whereby a color-superimposed layer 22 is formed. As described hereinafter, on the color-superimposed layer 22 are laminated color filters having different colors from each other when the CF substrate 20 is produced. For example, when the CF layer 22a is formed of a red resin, the CF layers 22b and 22c are formed of a green resin and a blue resin, respectively. Further, a common electrode, not shown, made of a transparent conductive film of ITO (Indium Tin Oxide) or the like is formed on the surface of the CF substrate 20 opposed to the TFT substrate 30. Furthermore, an alignment film, not shown, of a polymer film e.g. of polyimide, is formed on the CF substrate 20 when the CF substrate 20 and the TFT substrate 30 are bonded to each other.

The TFT substrate 30 includes a glass substrate 31, and a gate metal layer 32 of Al—Nd/MoN/Mo, formed on the glass substrate 31. On the gate metal layer 32 is formed a gate insulating film 33 made of SiN. Further, on a portion of the gate insulating film 33 as part of a TFT portion of the TFT substrate 30, is formed an amorphous silicon (a-Si) layer 34 as an operating layer, and on the a-Si layer 34 is formed a channel-protecting film layer 35 of SiN for protecting a channel region of the a-Si layer 34. On the layers 32 to 35 constructed as above, except for part of the channel-protecting film layer 35, there is formed a drain metal layer 37 made of Ti/Al/MoN/Mo via an n$^+$a-Si layer 36 for ohmic connection. Thus, reversely-staggered TFTs are constructed on the TFT substrate 30.

Further, on the structure constructed as above, there is formed a flattening layer 38 made of a resin material, such as an acrylic resin, and having a thickness of approximately 4 µm. The flattening layer 38 is formed with contact holes 39 having a diameter of approximately 5 µm and extending to the associated portion of the drain metal layer 37. Hereinafter, out of portions of a layer formed at respective locations on either substrate, one corresponding to one pixel will be simply referred to by the name of the layer, unless otherwise required. Although in the present embodiment, the flattening layer 38 has a thickness of approximately 4 µm, the thickness can be changed within a range of approximately 1 µm to approximately 4 µm. Further, it is preferable that the diameter of the contact holes 39 is minimized so as to prevent the aperture ratio of the liquid crystal panel 10 from being lowered.

On the flattening layer 38, there are formed pixel electrodes 40 of a transparent conductive film of ITO or the like. Each of the pixel electrodes 40 is formed on a surface of the flattening layer 38, a wall surface of the associated contact hole 39 and the drain metal layer 37, on a pixel area-by-pixel area basis. This causes the pixel electrode 40 and the drain metal layer 37 of the TFT to make contact with each other, in each pixel area, and upon formation of the pixel electrode 40 in the contact hole 39, the pixel electrode 40 has a recess formed at a location of the contact hole 39. On the pixel electrode 40, columnar layers 41a and 41b made of a resin material, such as an acrylic resin, are formed in the recess formed at the location of the contact hole 39, and an area opposed to the color-superimposed layer 22 of the CF substrate 20, respectively. When the CF substrate 20 and the TFT substrate 30 are bonded to each other, alignment films, not shown, are formed on such array substrates constructed as above.

The liquid crystal panel 10 is constructed by bonding the CF substrate 20 and the TFT substrate 30 to each other, and filling liquid crystal between the substrates 20 and 30. In the liquid crystal panel 10 thus constructed, the columnar layer 41a is formed in the recess at the location of the contact hole 39 in each pixel area on the TFT substrate 30. Further, in the liquid crystal panel 10, the cell gap between the substrates 20 and 30 is maintained by the laminated structures each composed of the color-superimposed layer 22 formed by CF layers 22a, 22b, and 22c, and the columnar layers 41b opposed to the color-superimposed layer 22. By forming the color-superimposed layer 22 described above, even if the columnar layers 41a and 41b are formed to have the same height, the columnar layer 41a partially formed in the recess formed at the location of the contact hole 39 is prevented from being brought into contact with the CF substrate 20 in a state where the liquid crystal panel 10 is not pressurized.

As described heretofore, in the liquid crystal panel 10 according to the first embodiment, the pixel electrode 40 is formed in the contact hole 39 in each pixel area, and the recess formed at the location of the contact hole 39 is filled with the columnar layer 41a. Further, the columnar layers 41a for filling the contact hole 39 are not used for maintaining the cell gap, but the cell gap is maintained by the columnar layers 41b formed at different locations from the locations of the hole-filling columnar layers 41a. The columnar layers 41b are formed such that the density of all the columnar layers 41b becomes optimum in the entire liquid crystal panel 10, without the respective locations thereof being limited to the locations of the recesses at the locations of the contact holes 39, respectively. Therefore, there are no air bubbles remaining after injection of liquid crystal or no foams remaining after formation thereof due to partial pressurization, whereby it is possible to realize a reliable liquid crystal panel 10 capable of effectively maintaining the cell gap.

Next, a description will be given of a method of manufacturing the liquid crystal panel 10 described above.

First, a method of manufacturing the CF substrate 20 will be described. The CF substrate 20 as a component of the liquid crystal panel 10 is prepared by forming a red resin, a green resin, and a blue resin in the form of stripes on the glass substrate 21 by the conventionally known method. In doing this, in areas to be opposed to the cell gap-maintaining columnar layers 41b formed on the TFT substrate 30, there are formed resins having different colors from the color of a resin of the first layer formed on the glass substrate 21, in a sequentially superimposed manner. For example, let it be assumed that a first row is formed by a red resin. In this case, when a row adjacent to the first row is formed by a green resin, the green resin is also formed in areas of the first row of the red resin, at locations to be opposed to the cell gap-maintaining columnar layers 41b, and further when a row of a blue resin is formed, the blue resin is also formed on the green resin formed on the red resin. As a result, the color-superimposed layers 22 are formed in the areas to be opposed to the areas of the cell gap-maintaining columnar layers 41b. On the color-superimposed layer 22, a common electrode is formed e.g. by ITO to thereby construct the basic structure of the CF substrate 20.

Next, a method of manufacturing the TFT substrate 30 will be described. The TFT substrate 30 is prepared by the conventionally known method as for the respective steps of forming TFTs on the glass substrate 31, forming the flattening layer 38, forming contact holes 39 therein, and then forming pixel electrodes 40. Here, the step of forming columnar layers 41a and 41b, which is carried out after the above-mentioned steps, will be described with reference to FIG. 2 to FIG. 4.

Figure 2:
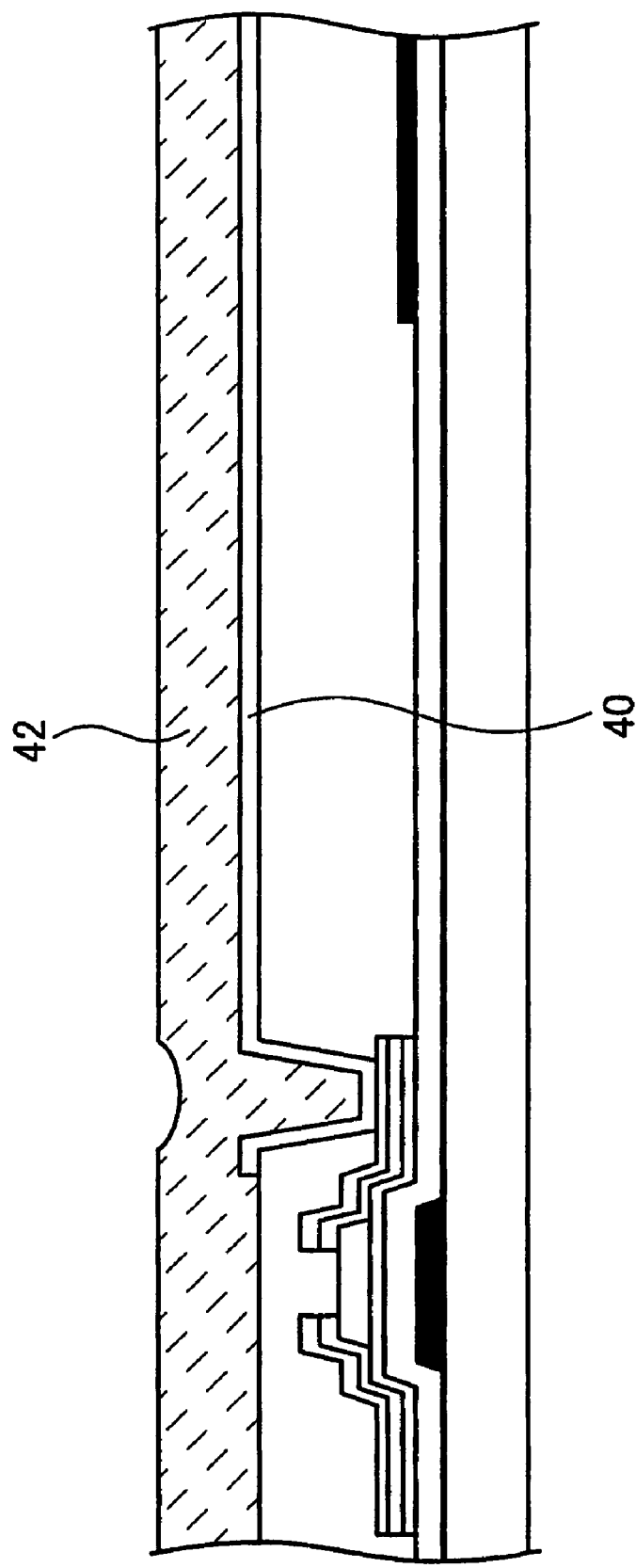
FIG. 2 is a cross-sectional view of essential elements of the liquid crystal panel according to the first embodiment, which is useful in explaining a resin-coating step.
Figure 3:
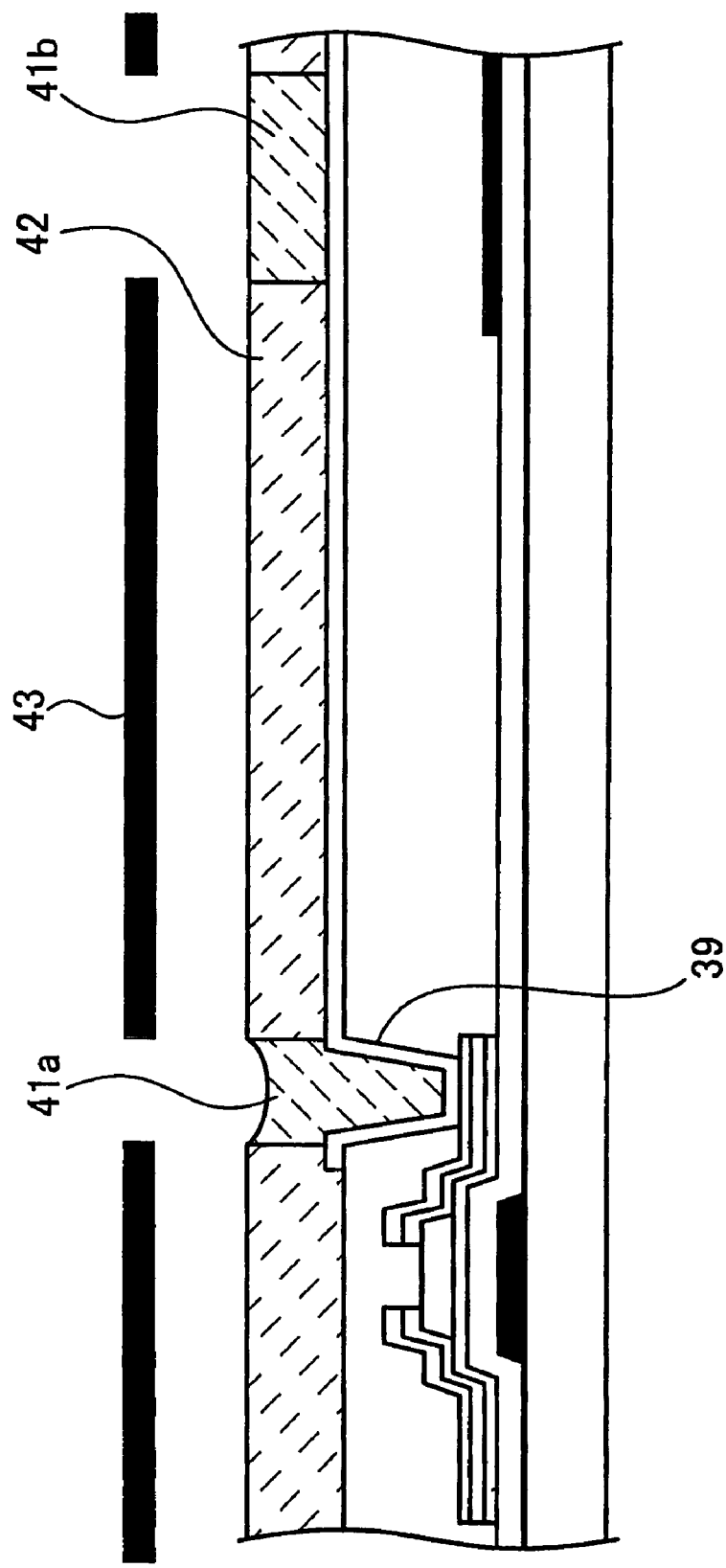
FIG. 3 is a cross-sectional view of essential elements of the liquid crystal panel according to the first embodiment, which is useful in explaining an exposing step.
Figure 4:
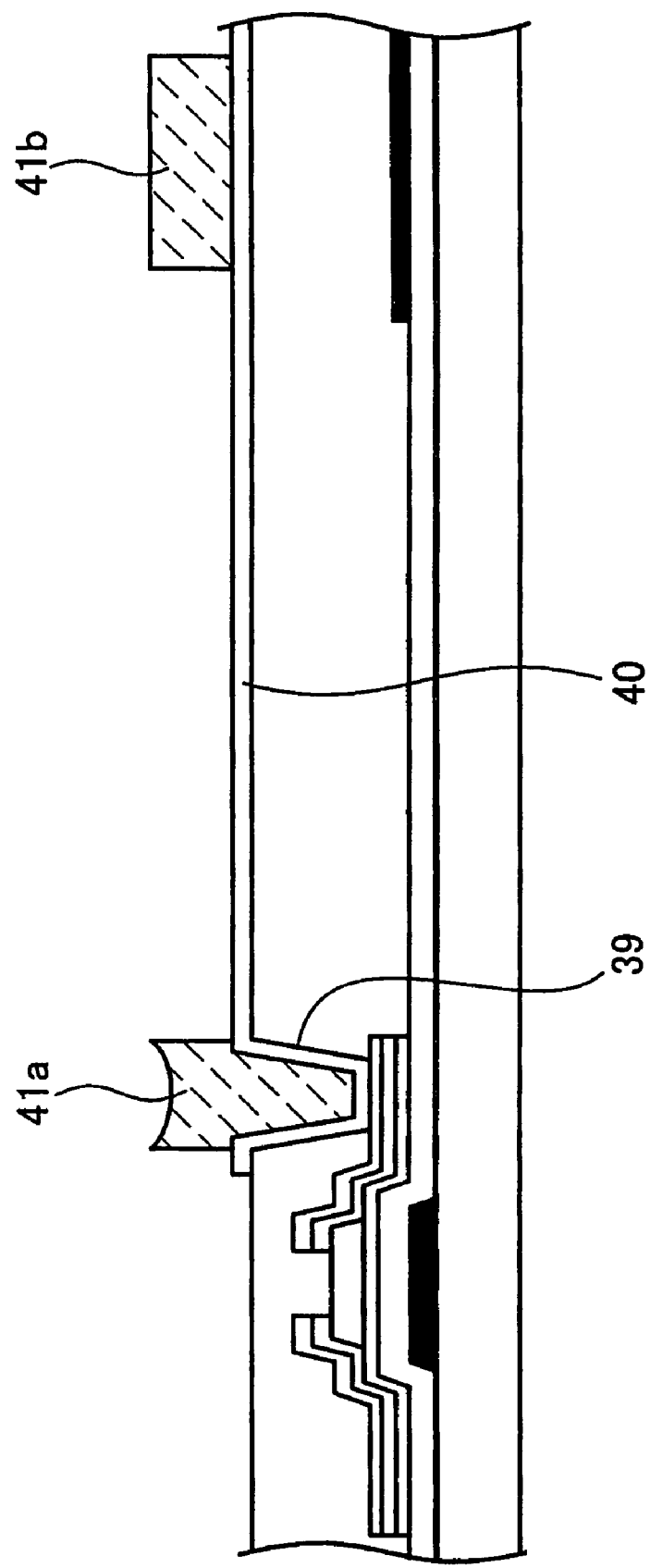
FIG. 4 is a cross-sectional view of essential elements of the liquid crystal panel according to the first embodiment, which is useful in explaining a developing step.

FIG. 2 is a cross-sectional view of essential elements of the liquid crystal panel according to the present embodiment, which is useful in explaining a resin-coating step. FIG. 3 is a cross-sectional view of the same, which is useful in explaining an exposing step. FIG. 4 is a cross-sectional view of the same, which is useful in explaining a developing step.

To form the columnar layers 41a and 41b of the TFT substrate 30, as shown in FIG. 2, a negative photosensitive acrylic resin 42 is applied over the entire surface of the array substrate for which formation of the pixel electrodes 40 has been completed, such that the resin 42 has a thickness of approximately 4 μm. The negative photosensitive acrylic resin 42 can be applied e.g. by the spin coating method conventionally generally employed.

Subsequently, as shown in FIG. 3, an area having a diameter of 5 μm with the contact hole 39 formed therein, and an area having a diameter of 20 μm in which the cell gap-maintaining columnar layer 41b is to be formed are exposed to light using a light-shielding mask 43 formed with openings corresponding to the above respective areas, whereby portions of the negative photosensitive acrylic resin 42, where the columnar layers 41a and 41b are to be formed, are caused to react with the light.

After termination of the exposure, the negative photosensitive acrylic resin 42 is developed for post curing, whereby as shown in FIG. 4, there are simultaneously formed the resin columnar layers 41a for filling the recess formed at the location of the contact hole 39 after formation of the pixel electrode 40 therein, and the resin columnar layer 41b for maintaining the cell gap As a result, the basic structure of the TFT substrate 30 is constructed.

After that, similarly to the method conventionally generally employed, the TFT substrate 30 and the CF substrate 20 each coated with an alignment film, are bonded to each other, liquid crystal is filled between the substrates 30 and 20, and finally polarizing plates are bonded to respective outer surfaces of the substrates 30 and 20, whereby the liquid crystal panel 10 is completed. Of course, it is possible to bond the CF substrate 20 and the TFT substrate 30 to each other after liquid crystal is dropped onto the substrate 20 or 30.

Although in forming the columnar layers 41a of the TFT substrate 30, the photosensitive area of the negative photosensitive acrylic resin 42 is configured to have the same size as the diameter of the contact hole 39 (i.e. the diameter of a portion of the contact hole 39, having a maximum cross-sectional area), this is not limitative, but in view of possibility of occurrence of displacement between the photosensitive area and an actual location of the contact hole 39 during exposure, the photosensitive area may be configured to have a diameter approximately 3 μm larger than the diameter of the contact hole 39. However, if a columnar layer 41a having a larger diameter than that of the contact hole 39 as described above, a portion of the columnar layer 41a extending beyond the recess at the location of the contact hole 39 over the pixel electrode 40 can have the same height as that of the cell gap-maintaining columnar layer 41b. When the columnar layer 41a formed in the recess is not used for maintaining the cell gap, as described hereinabove, the color-superimposed layer 22 is formed in advance on the CF substrate 20, whereby a gap is secured between the columnar layer 41a and the CF substrate 20. Although the color-superimposed layer 22 is not necessarily required depending on the case, it is preferable to form the color-superimposed layers 22 in advance, so as to impart a certain degree of freedom of deformation to the liquid crystal panel 10 to thereby effectively maintain the cell gap.

Further, although in the present embodiment, the columnar layers 41a and 41b are formed by using the negative photosensitive acrylic resin 42, of course, it is also possible to form them using a positive photosensitive acrylic resin. Further, the columnar layers 41a and 41b can be formed using not only the photosensitive acrylic resins but also any of other suitable photosensitive resin materials.

As described hereinbefore, according to the method of manufacturing the liquid crystal panel 10, the columnar layers 41a for filling the recesses formed at the locations of the contact holes 39 and the cell gap-maintaining columnar layers 41b can be simultaneously formed. Therefore, it is possible to manufacture the liquid crystal panel 10 which does not suffer from occurrence of air bubbles remaining after injection of liquid crystal and foams remaining after formation thereof due to partial pressurization, and further has the cell gap-maintaining columnar layers 41b arranged at an appropriate density thereof with high productivity.

The formation of the hole-filling columnar layers 41a and the cell gap-maintaining columnar layers 41b can be applied not only to the liquid crystal panel 10 according to the first embodiment but also to various liquid crystal panels of other types.

Next, a description will be given of a second embodiment of the present invention.

Figure 5:
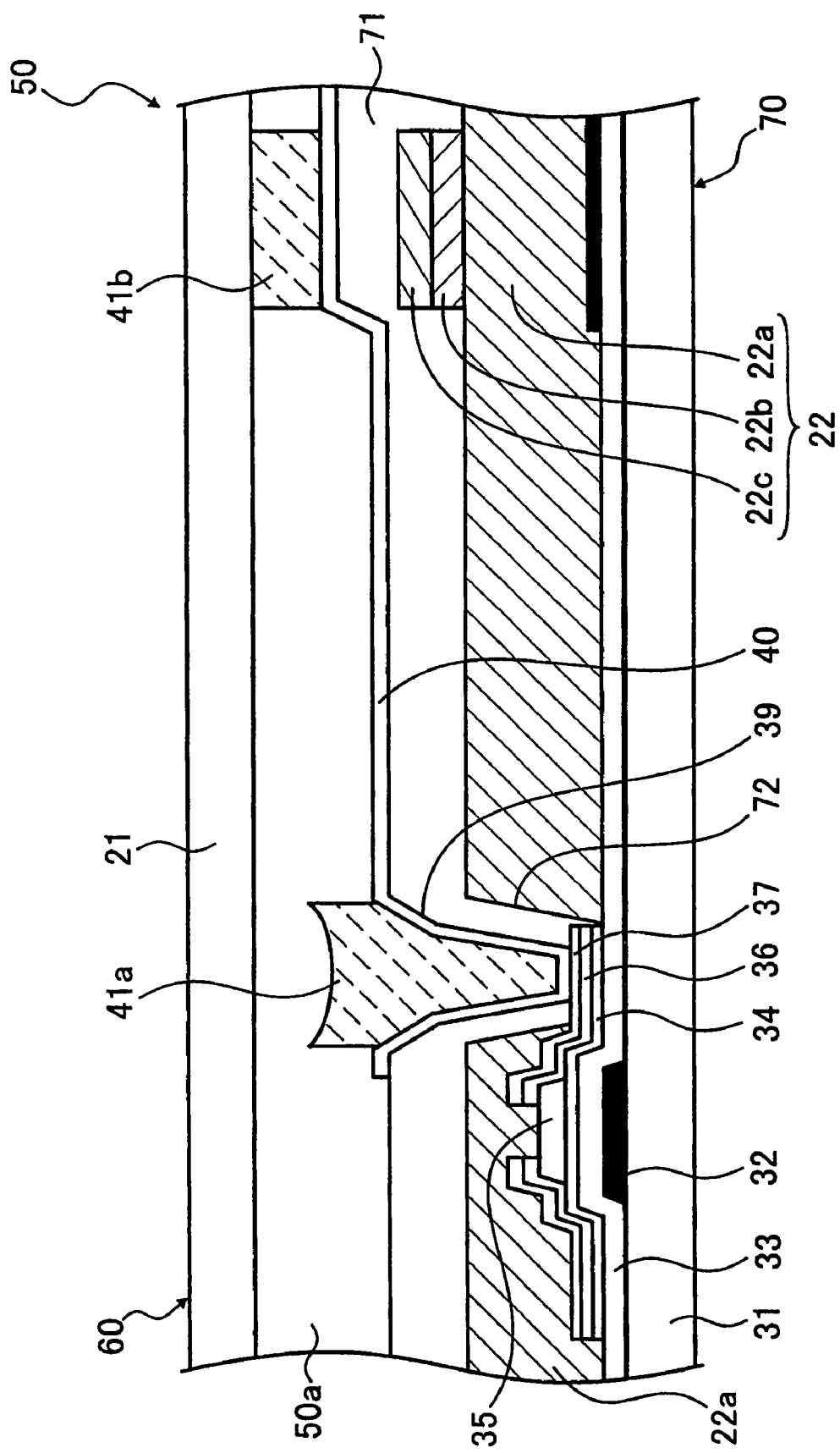
FIG. 5 is a cross-sectional view of essential elements of a liquid crystal panel according to a second embodiment of the present invention.

FIG. 5 is a cross-sectional view of essential elements of a liquid crystal panel according to the second embodiment. It should be noted that FIG. 5 shows only part of the liquid crystal panel, corresponding to one pixel, with component elements identical to those shown in FIG. 1 being designated by identical reference numerals, and detailed description thereof is omitted.

The liquid crystal panel 50 according to the second embodiment is distinguished from the liquid crystal panel 10 according to the first embodiment in that it has a structure in which a common electrode substrate 60 and a TFT substrate 70 are bonded to each other with a liquid crystal layer 50a sandwiched therebetween, and CF layers 22a, 22b, and 22c are formed on the TFT substrate 70 side.

The common electrode substrate 60 as a counter substrate opposed to the TFT substrate 70 has a basic structure in which a common electrode, not shown, is formed on a glass substrate 21. When the common electrode substrate 60 and the TFT substrate 70 are bonded to each other, alignment films, not shown, are formed.

The TFT substrate 70 includes a glass substrate 31, and a gate metal layer 32, a gate insulating film 33, an a-Si layer 34, and a channel-protecting film layer 35, formed on the glass substrate 31, with a drain metal layer 37 formed on the a-Si layer 34 via an n$^+$a-Si layer 36. On the structure constructed as above, there are formed a CF layer 22a, and CF layers 22b and 22c partially laminated on the CF layer 22a to form a color-superimposed layer 22, and further formed an overcoat (OC) layer 71 and pixel electrodes 40. After the CF layer 22a is formed, a contact hole 72 is formed in the CF layer 22a such that the contact hole 72 reaches the drain metal layer 37, and thereafter the OC layer 71 is formed. Further, a contact hole 39 reaching the drain metal layer 37 is formed in the OC layer 71. The pixel electrode 40 is formed on a surface of the OC layer 71, a wall surface of the contact hole 39, and the drain metal layer 37. This causes the pixel electrode 40 and the drain metal layer 37 to make contact with each other, and the pixel electrode 40 has a recess formed at a location corresponding to the contact hole 39. In the recess of the pixel electrode 40 and on an area of the same exactly above the color-superimposed layer 22, there are respectively formed columnar layers 41a and 41b made of a resin material, such as an acrylic resin.

The columnar layers 41a and 41b can be formed in the same manner as described in the first embodiment. More specifically, it is only required to apply a negative or positive photosensitive resin over the entire surface of an array substrate for which formation of up to the pixel electrodes 40 is completed, and then expose the photosensitive resin to light in areas of the array substrate to be formed with the columnar layers 41a for filling the recesses at the respective locations of the contact holes 39 and areas of the array substrate to be formed with the cell gap-maintaining columnar layers 41b to perform the development process. This enables the columnar layers 41a and 41b to be formed simultaneously.

However, when the CF layer 22a is formed on the TFT substrate 70 side as described above, the diameter of the contact hole 72 formed in the CF layer 22a is increased to become approximately 10 μm, since the pattern-forming accuracy of the CF layer is generally not high. As a result, the OC layer 71 comes to be formed with the contact holes 39 having a diameter increased with increase in the diameter of the contact holes 72. Therefore, it is preferable that photosensitive areas of the photosensitive resin having approximately the same size as that of the contact holes 72 are formed in the CF layer 22a so as to cause the recesses formed at the locations of the contact hole 39 to be filled. Further, although the CF layers 22b and 22c formed in a manner superimposed on the CF layer 22a are not necessarily required, it is preferable to form the CF layers 22b and 22c in advance so as to effectively maintain the cell gap between the substrates 60 and 70.

As described above, in the liquid crystal panel 50 according to the second embodiment as well, similarly to the first embodiment, the pixel electrode 40 is formed in the contact hole 39 in each pixel area, and the recess formed at the location of the contact hole 39 is filled with the columnar layer 41a, so that there are no air bubbles remaining after injection of liquid crystal or no foams remaining after formation thereof due to partial pressurization. Further, the cell gap between the common electrode substrate 60 and the TFT substrate 70 can be maintained by the columnar layers 41b. The columnar layers 41b are formed such that the density of all the columnar layers 41b becomes optimum in the entire liquid crystal panel 50, without the respective locations thereof being limited to the locations of the recesses at the locations of the contact holes 39, respectively. These columnar layers 41a and 41b can be simultaneously formed by the exposing and developing processes of the photosensitive resin, which makes it possible to effectively form the liquid crystal panel 50.

Next, a description will be given of a third embodiment of the present invention.

Figure 6:
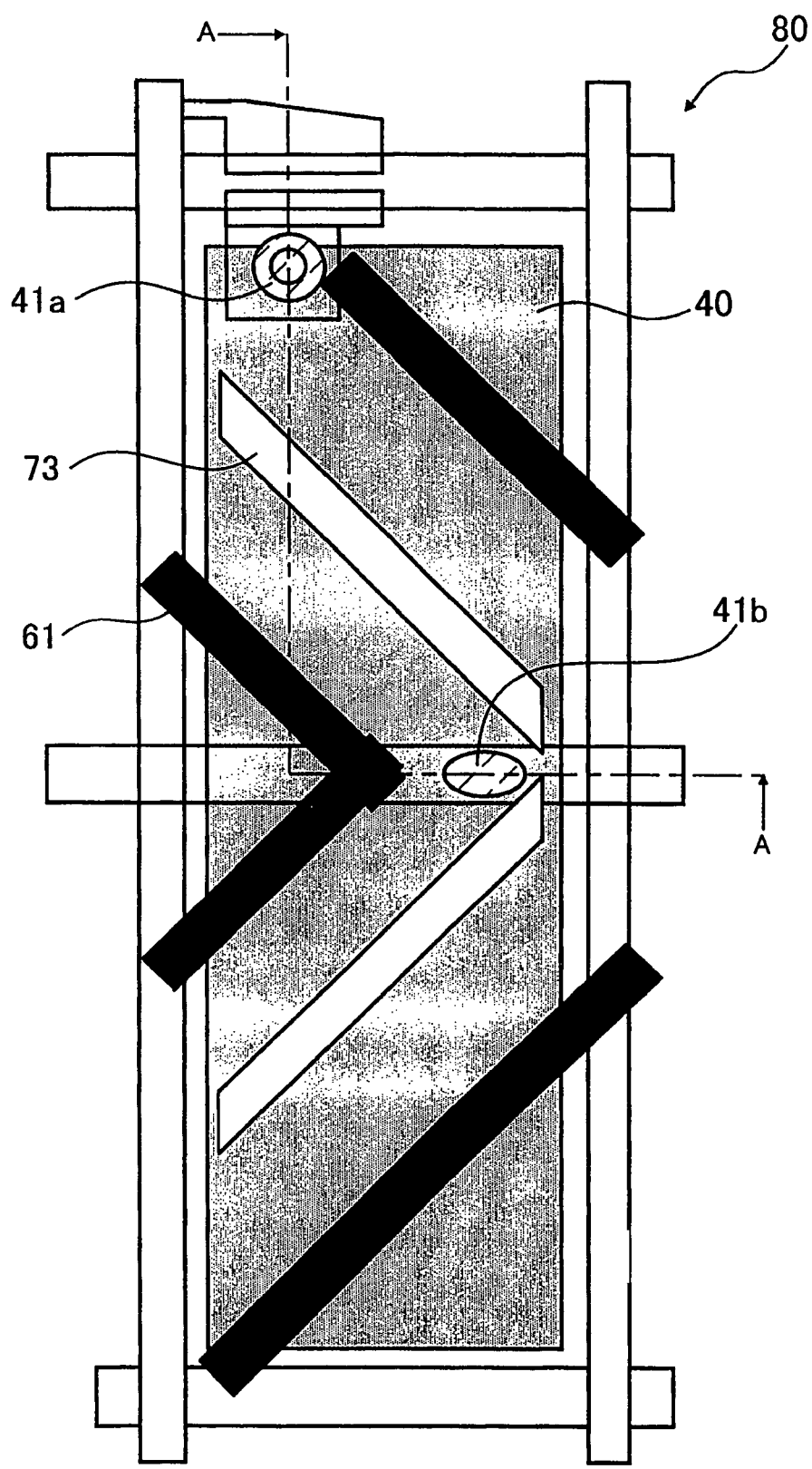
FIG. 6 is a cross-sectional view of essential elements of a liquid crystal panel according to a third embodiment of the present invention.
Figure 7:
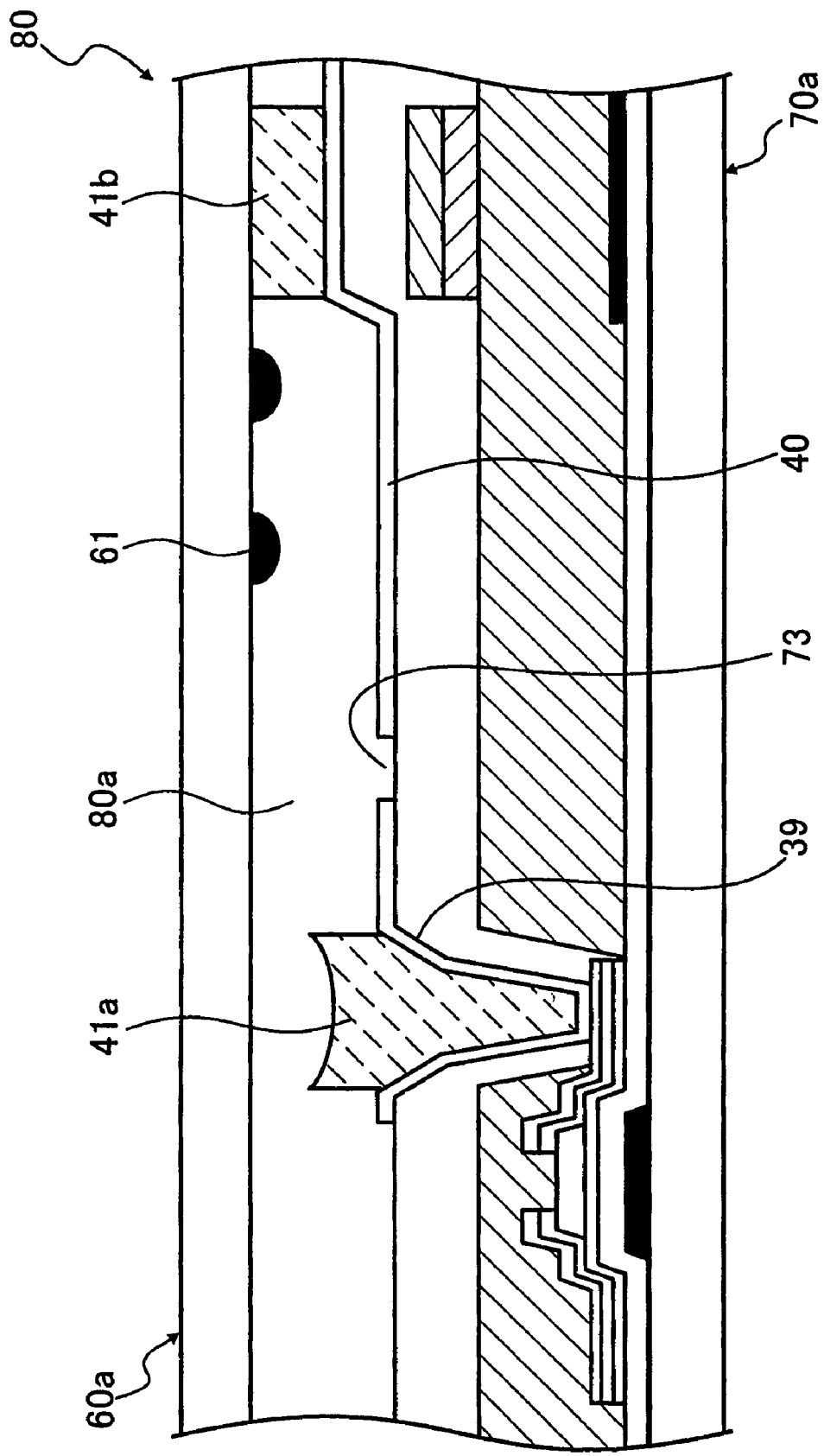
FIG. 7 is a cross-sectional view taken on line A-A of FIG. 6.

FIG. 6 is a cross-sectional view of essential elements of a liquid crystal panel according to the third embodiment. FIG. 7 is a cross-sectional view taken on line A-A of FIG. 6. It should be noted that FIG. 6 and FIG. 7 show only part of the liquid crystal panel, corresponding to one pixel, with component elements identical to those shown in FIG. 5 being designated by identical reference numerals, and detailed description thereof is omitted.

The liquid crystal panel 80 according to the third embodiment is distinguished from the liquid crystal panel 50 according to the second embodiment in that it has a structure in which a common electrode substrate 60a and a TFT substrate 70a are bonded to each other, with a liquid crystal layer 80a sandwiched therebetween, protrusions 61 of dielectric layers are formed on a common electrode formed on the common electrode substrate 60a, and two slits 73 are formed in a pixel electrode 40 formed on the TFT substrate 70a. The other components are similar to those of the liquid crystal panel 50 according to the second embodiment. By forming the protrusions 61 and the slits 73 as described above, it is possible, when a voltage is applied, to control the orientation of liquid crystal molecules in the liquid crystal panel 80 by the protrusions 61 and the slits 73, whereby it becomes possible to realize a wide angle of visibility.

In the liquid crystal panel 80, similarly to the second embodiment, columnar layers 41a and 41b can be formed simultaneously on the TFT substrate 70a by the processes of exposing and developing a photosensitive resin. The common electrode substrate 60a and the TFT substrate 70a, each coated with a vertical alignment film, are bonded to each other after a peripheral seal for the panel is formed, negative liquid crystal having negative dielectric anisotropy is injected between the substrates 60a and 70a, and finally polarizing plates are bonded to respective outer surfaces of the substrates 60a and 70a, whereby the liquid crystal panel 80 is constructed.

As described above, also in the liquid crystal panel 80 according to the third embodiment, the pixel electrode 40 is formed in the contact hole 39 in each pixel area, and the recess formed at the location of the contact hole 39 is filled with the columnar layer 41a, so that there are no air bubbles remaining after injection of liquid crystal or no foams remaining after formation thereof due to partial pressurization. Further, the cell gap between the common electrode substrate 60a and the TFT substrate 70a can be maintained by the columnar layers 41b. The columnar layers 41b are formed such that the density of all the columnar layers 41b becomes optimum in the entire liquid crystal panel 80, without the respective locations thereof being limited to the locations of the recesses at the locations of the contact holes 39, respectively. These columnar layers 41a and 41b can be simultaneously formed by the exposing and developing processes of the photosensitive resin, which makes it possible to effectively form the liquid crystal panel 80.

Although the liquid crystal panel 80 according to the third embodiment is configured such that the protrusions 61 and the slits 73 are both formed, even when only one of them is formed, it is possible to control the orientation of liquid crystal molecules. In this case as well, the method of forming the columnar layers 41a and 41b is not changed at all.

Next, a description will be given of a fourth embodiment of the present embodiment.

Figure 8:
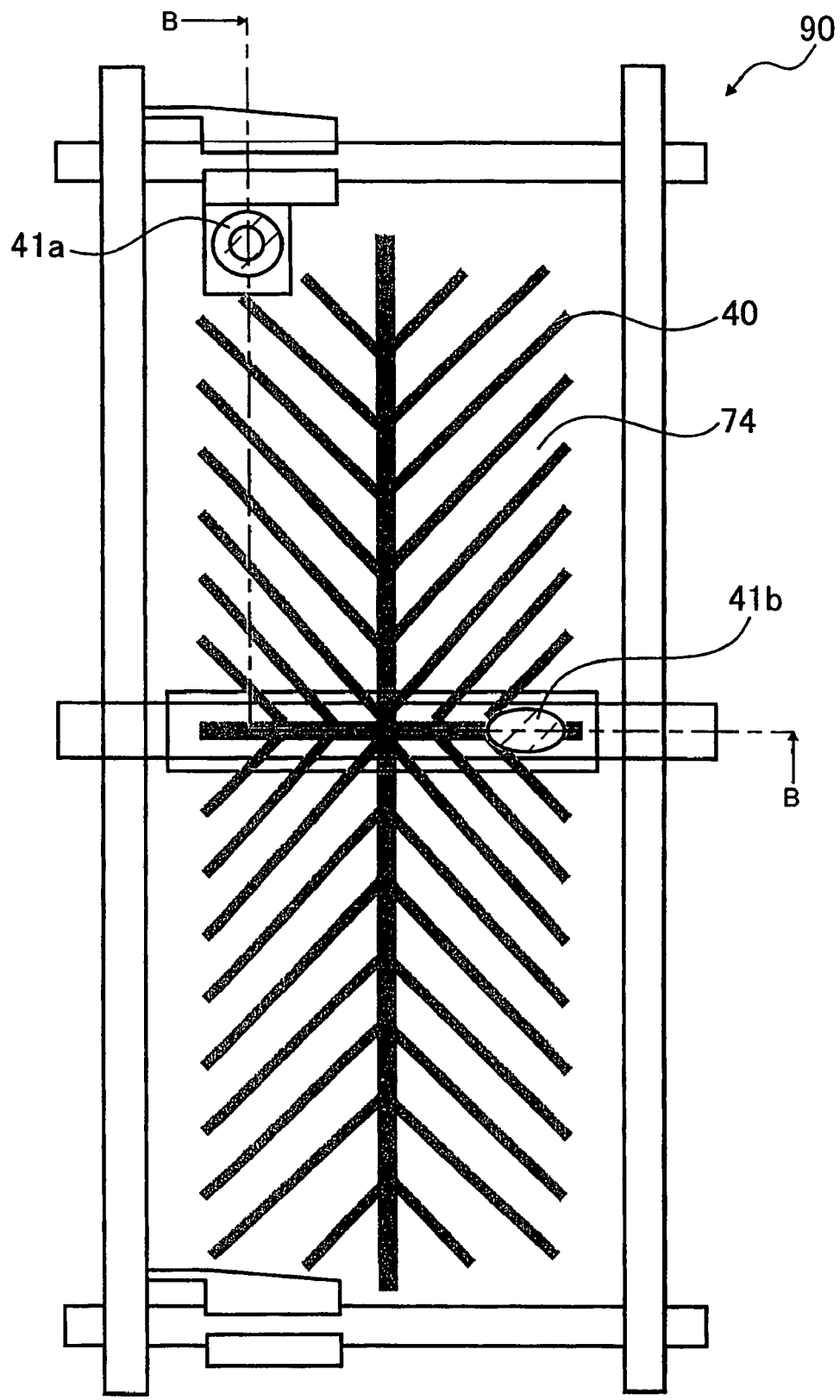
FIG. 8 is a cross-sectional view of essential elements of a liquid crystal panel according to a fourth embodiment of the present invention.
Figure 9:
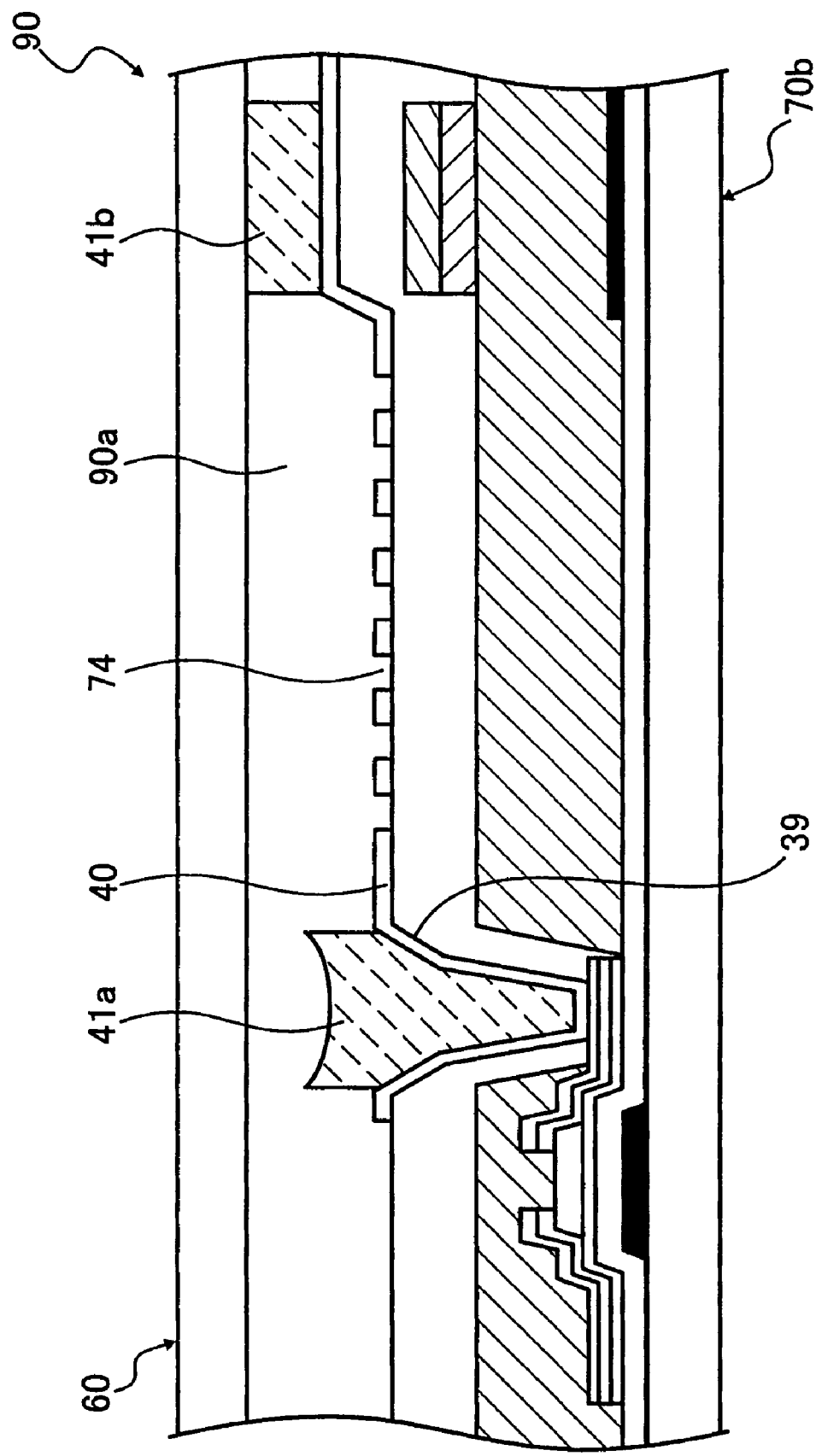
FIG. 9 is a cross-sectional view taken on line B-B of FIG. 8.

FIG. 8 is a cross-sectional view of essential elements of a liquid crystal panel according to the fourth embodiment. FIG. 9 is a cross-sectional view taken on line B-B of FIG. 8. It should be noted that FIG. 8 and FIG. 9 show only part of the liquid crystal panel, corresponding to one pixel, with component elements identical to those shown in FIG. 5 being designated by identical reference numerals, and detailed description thereof is omitted.

The liquid crystal panel 90 according to the fourth embodiment is distinguished from the liquid crystal panel 50 according to the second embodiment in that it has a structure in which a common electrode substrate 60 and a TFT substrate 70b are bonded to each other, with a liquid crystal layer 90a sandwiched therebetween, and a pixel electrode 40 on the TFT substrate 70b is formed with a large number of fine slits 74. The other components are the same as those of the liquid crystal panel 50 according to the second embodiment. The slits 74 in the fourth embodiment are formed in a direction in which a pixel area is divided into at least two or more parts. FIG. 9 shows a case where the pixel area is divided into four. If the slits 74 are formed in the pixel electrode 40 as described above, it becomes possible, when a voltage is applied, to control the orientation of liquid crystal molecules in the liquid crystal panel 90 by the slits 74. This makes it possible to realize a wide angle of visibility.

In this liquid crystal panel 90 as well, columnar layers 41a and 41b can be formed simultaneously on the TFT substrate 70b by the processes of exposing and developing a photosensitive resin.

To form the liquid crystal panel 90, first, the common electrode substrate 60 and the TFT substrate 70b, each coated with a vertical alignment film, are bonded to each other after a peripheral seal for the panel is formed. After that, negative liquid crystal having negative dielectric anisotropy and 0.2 wt % of an ultraviolet-curing monomer added thereto is injected between the substrates 60 and 70b. Then, the liquid crystal molecules are inclined by applying thereto voltages equal to or higher than the threshold value thereof, for example, a gate voltage of 30V DC, a data voltage of 10V DC, and a common voltage of 5V DC, and in this state, irradiation of ultraviolet rays is performed at a wavelength of 300 nm to 450 nm in an amount of 2000 mj from the side of the common electrode substrate 60. As a result, a polymer is formed from the ultraviolet-curing monomer, and the direction of orientation of the liquid crystal molecules in a state where no voltage being applied thereto is determined. Finally, polarizing plates are bonded to the common electrode substrate 60 and the TFT substrate 70b, respectively, in crossed-Nicols arrangement such that the polarization direction and the direction of orientation of the liquid crystal molecules form an angle of 45 degrees, whereby the liquid crystal panel 90 is formed. In the liquid crystal panel 90 according to the fourth embodiment, the pretilt angle of the liquid crystal molecules is made equal to approximately 86 degrees.

As described above, also in the liquid crystal panel 90 according to the fourth embodiment, the pixel electrode 40 is formed in the contact hole 39 in each pixel area, and the recess formed at the location of the contact hole 39 is filled with the columnar layer 41a, so that there are no air bubbles remaining after injection of liquid crystal or no foams remaining after formation thereof due to partial pressurization. Further, the cell gap between the common electrode substrate 60 and the TFT substrate 70b can be maintained by the columnar layers 41b. The columnar layers 41b are formed such that the density of all the columnar layers 41b becomes optimum in the entire liquid crystal panel 90, without the respective locations thereof being limited to the locations of the recesses at the locations of the contact holes 39, respectively. These columnar layers 41a and 41b can be simultaneously formed by the exposing and developing processes of the photosensitive resin, which makes it possible to effectively form the liquid crystal panel 90.

Next, a description will be given of a fifth embodiment of the present invention.

Figure 10:
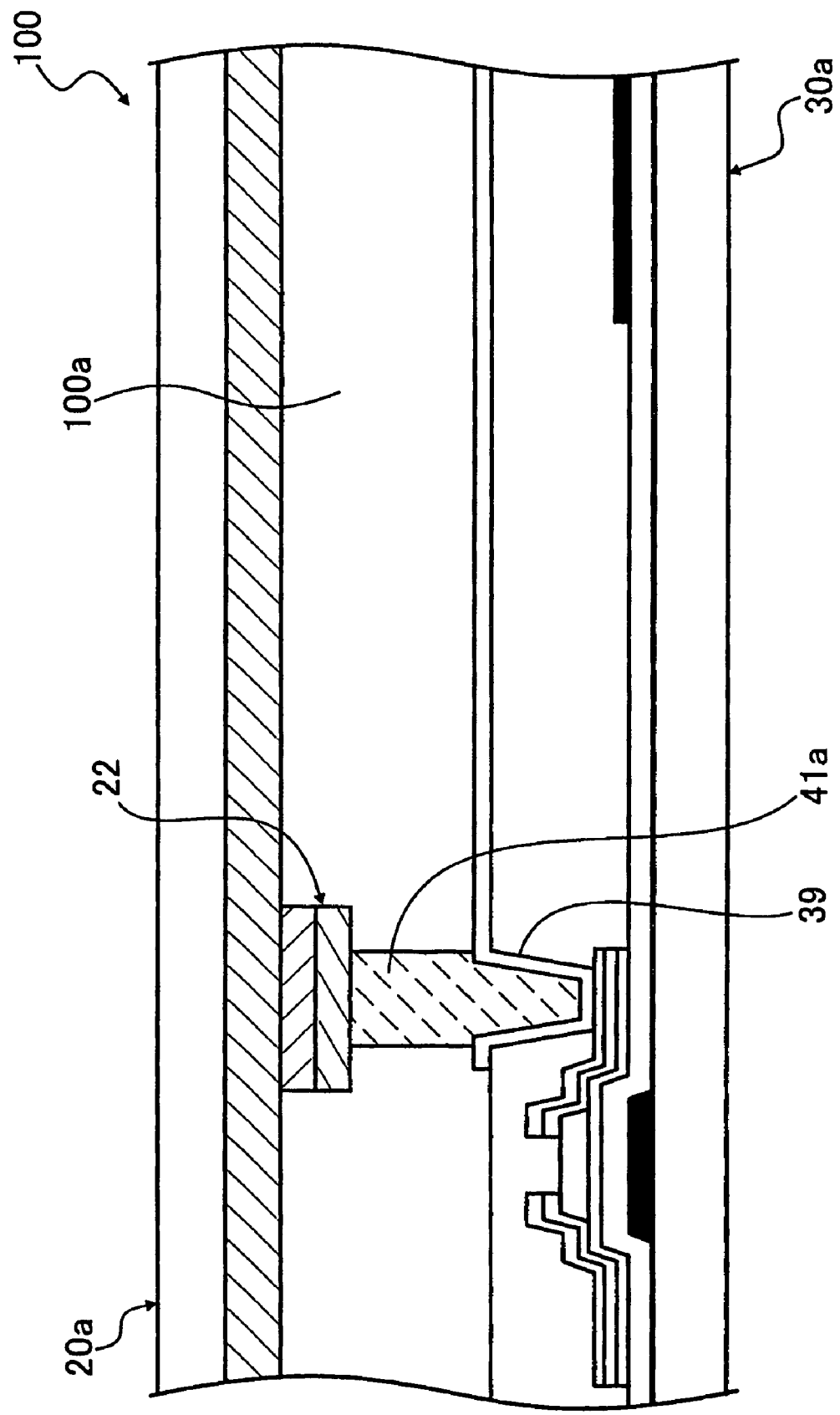
FIG. 10 is a cross-sectional view of essential elements of a liquid crystal panel according to a fifth embodiment of the present invention.

FIG. 10 is a cross-sectional view of essential elements of a liquid crystal panel according to the fifth embodiment. It should be noted that FIG. 10 shows only part of the liquid crystal panel, corresponding to one pixel, with component elements identical to those shown in FIG. 1 being designated by identical reference numerals, and detailed description thereof is omitted.

The liquid crystal panel 100 according to the fifth embodiment is distinguished from the liquid crystal panel 10 according to the first embodiment in that it has a structure in which a CF substrate 20a and a TFT substrate 30a are bonded to each other, with a liquid crystal layer 100a sandwiched therebetween, and color-superimposed layers 22 on the CF substrate 20a are formed in areas corresponding to respective locations of recesses formed at the locations of contact holes 39 such that the cell gap between the CF substrate 20a and the TFT substrate 30a is maintained by columnar layers 41a formed in the recesses. In the case of the fifth embodiment, it is not necessarily required to form columnar layers for maintaining the cell gap.

The columnar layers 41a on the TFT substrate 30a can be formed similarly to the columnar layers 41a and 41b described above in the first embodiment. For example, to form the columnar layers 41a shown in FIG. 10, it is only required to perform the exposing and developing processes on a photosensitive resin using a light-shielding mask having openings corresponding only to areas formed respectively with the contact holes 39, to thereby form only the columnar layers 41a. However, if color-superimposed layers 22 are formed on the CF substrate 20a for all the columnar layers 41a, the density of the columnar layers 41a that contribute to maintaining of the cell gap is made higher than required. Therefore, the color-superimposed layers 22 are formed at locations opposed to columnar layers 41a which are selected such that the density of the columnar layers is suitable for maintaining the cell gap.

As described above, also in the liquid crystal panel 100 according to the fifth embodiment, the pixel electrode 40 is formed in the contact hole 39 in each pixel area, and the recess formed at the location of the contact hole 39 is filled with the columnar layer 41a, so that there are no air bubbles remaining after injection of liquid crystal or no foams remaining after formation thereof due to partial pressurization. Further, the cell gap between the CF substrate 20a and the TFT substrate 30a can be maintained by the columnar layers 41a. The columnar layers 41a are formed such that the density of all the columnar layers 41a becomes optimum in the entire liquid crystal panel 100.

Next, a description will be given of a sixth embodiment of the present invention.

Figure 11:
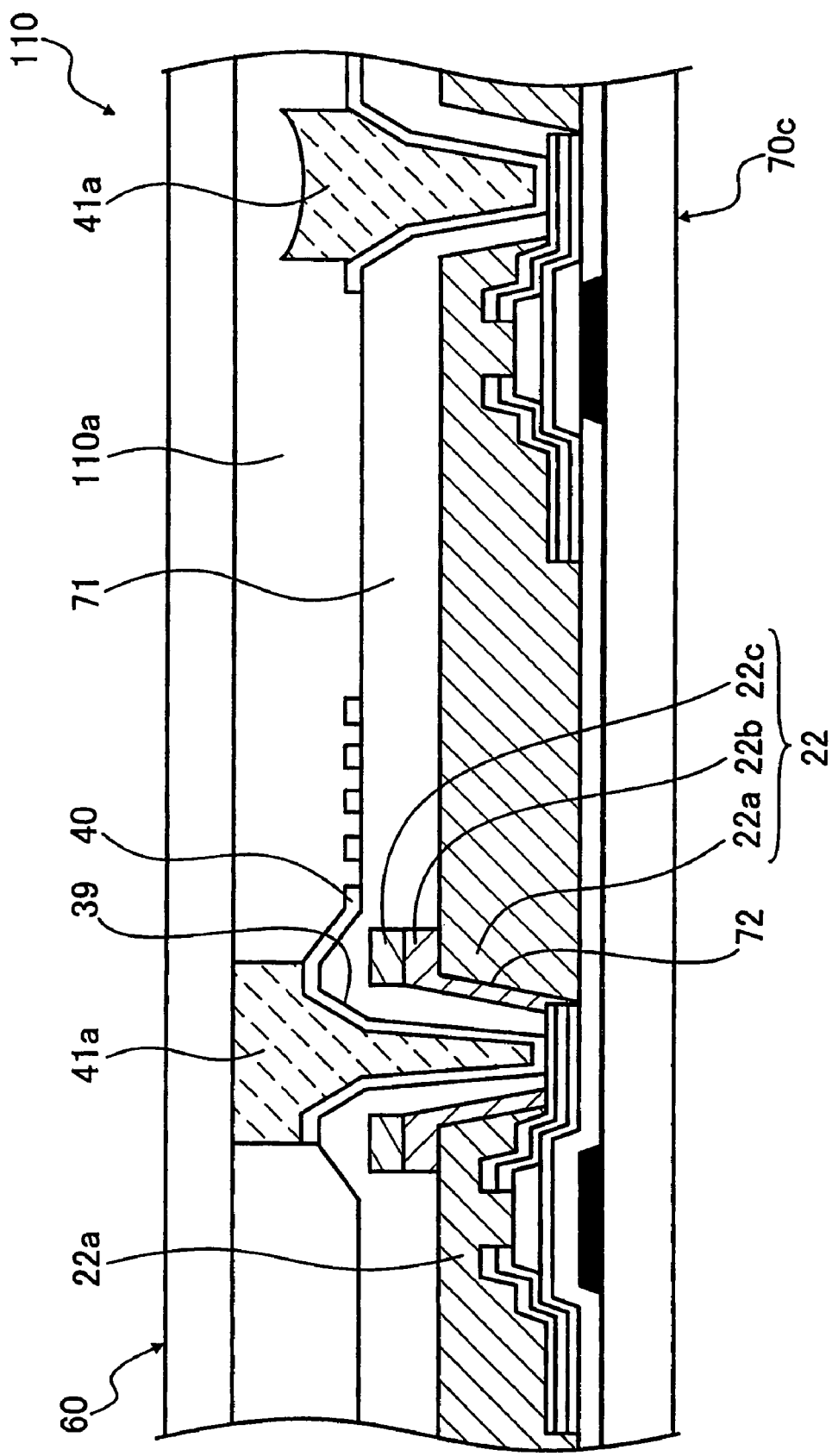
FIG. 11 is a cross-sectional view of essential elements of a liquid crystal panel according to a sixth embodiment of the present invention.

FIG. 11 is a cross-sectional view of essential elements of a liquid crystal panel according to the sixth embodiment. It should be noted that FIG. 11 shows only part of the liquid crystal panel, corresponding to one pixel, with component elements identical to those shown in FIG. 5 being designated by identical reference numerals, and detailed description thereof is omitted.

The liquid crystal panel 110 according to the sixth embodiment is distinguished from the liquid crystal panel 50 according to the second embodiment in that it has a structure in which a common electrode substrate 60 and a TFT substrate 70c are bonded to each other, with a liquid crystal layer 110a sandwiched therebetween, and color-superimposed layers 22 are formed at respective locations close to contact holes 39 on the TFT substrate 70c such that the cell gap between the common electrode substrate 60 and the TFT substrate 70c is maintained by columnar layers 41a formed in recesses formed at the locations of the contact holes 39. In the case of the sixth embodiment, it is not necessarily required to form columnar layers for maintaining the cell gap.

To form the columnar layers 41a on the TFT substrate 70c of the liquid crystal panel 110, first, contact holes 72 are formed in a CF layer 22a, and then CF layers 22b and 22c are formed on the rim of each of the contact holes 72 to thereby form the color-superimposed layer 22. In this case, however, the color-superimposed layers 22 are formed only at locations of ones of the columnar layers 41a used for maintaining the cell gap, in view of the density of the columnar layers 41a formed in the entire liquid crystal panel 110. After the color-superimposed layers 22 are formed, an OC layer 71 is formed and the contact holes 39 are formed, followed by forming pixel electrodes 40. As a result, recesses are formed at the respective locations of the contact holes 39. Then, in the same manner as described above in the second embodiment, a photosensitive resin is subjected to exposure and development using a light-shielding mask formed with openings corresponding to areas where the contact holes 39 are formed, whereby the columnar layers 41a are formed in the recesses formed at the locations of the contact holes 39.

As described above, also in the liquid crystal panel 110 according to the sixth embodiment, the pixel electrode 40 is formed in the contact hole 39 in each pixel area, and the recess formed at the location of the contact hole 39 is filled with the columnar layer 41a, so that there are no air bubbles remaining after injection of liquid crystal or no foams remaining after formation thereof due to partial pressurization. Further, the cell gap between the common electrode substrate 60 and the TFT substrate 70c can be maintained by the columnar layers 41a formed in selected ones the recesses in view of the density of the columnar layers.

It should be noted that in the liquid crystal panels 10, 100, and 110 according to the first, fifth, and sixth embodiments, it is possible to provide protrusions on the CF substrates 20 and 20a, and the common electrode substrate 60, thereby making it possible to control the orientation of liquid crystal molecules. Alternatively, it is also possible to provide a plurality of slits in any of the pixel electrode 40 on the TFT substrates 30, 30a, and 70c, to enable control of the orientation of liquid crystal molecules. Of course, both of the protrusions and slits may be formed for control of the orientation of liquid crystal molecules.

Further, although in the liquid crystal panels 10, 50, 80, and 90 according to the first to fourth embodiments, the cell gap-maintaining columnar layers 41b and the hole-filling columnar layers 41a are simultaneously formed, this is not limitative, but the columnar layers 41b can be provided on the side of the CF substrate 20, or on the side of the common electrode substrates 60 and 60a. In the liquid crystal panels 100 and 110 according to the fifth and sixth embodiments, it is possible to form the columnar layers 41a on the side of the CF substrate 20a and on the side of the common electrode substrate 60.

Further, although in the embodiments described above, the color-superimposed layers are formed to thereby provide a gap between the columnar layers exclusively provided for filling contact holes, and the CF substrate or the common electrode substrate, opposed thereto, this is not limitative, but it is possible to configure the liquid crystal panel such that the above-mentioned gap is provided not by forming the color-superimposed layers but by subjecting a photosensitive resin to halftone exposure to thereby form hole-filling columnar layers and cell gap-maintaining columnar layers different in thickness between the two types of columnar layers.

In addition to the halftone exposure, it is also possible to employ overexposure to form columnar layers different in thickness, in the case where a positive photosensitive resin is used to form columnar layers. When the positive photosensitive resin is subjected to overexposure, the thickness of columnar layers formed in such small areas for filling the recesses become thinner than that of columnar layers formed in such large areas for maintaining the cell gap, whereby it is possible to form hole-filling columnar layers and cell gap-maintaining columnar layers such that the two types of columnar layer are different in thicknesses between them.

As described hereinbefore, in the present invention, recesses which are produced by forming pixel electrodes in contact holes each formed for connecting a thin film transistor and a pixel electrode to each other, are filled with hole-filling columnar layers, and the cell gap between a thin film transistor substrate and a substrate opposed thereto is maintained by cell gap-maintaining columnar layers. This makes it possible to realize a highly reliable liquid crystal panel which does not suffer from air bubbles remaining in recesses formed in the contact holes and capable of efficiently maintaining the cell gap.

Further, since columnar layers for filling contact holes and columnar layers maintaining the cell gap are simultaneously formed, it is possible to manufacture a highly reliable liquid crystal panel which does not suffer from air bubbles remaining in recesses formed in the contact holes and capable of efficiently maintaining the cell gap with high productivity at low costs.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A liquid crystal panel including a thin film transistor substrate formed with thin film transistors for driving pixel electrodes, a counter substrate provided in a manner opposed to the thin film transistor substrate, and a liquid crystal layer sandwiched between the thin film transistor substrate and the counter substrate, the liquid crystal panel comprising:

hole-filling columnar layer portions for filling recesses produced by forming the pixel electrodes in contact holes each formed for connecting each of the thin film transistors and an associated one of the pixel electrodes to each other; and cell gap-maintaining columnar layer portions for maintaining a cell gap between the thin film transistor substrate and the counter substrate, wherein respective heights of the hole-filling columnar layer portions are larger than respective depths of the contact holes, and wherein color-superimposed layers consisting of color filter layers are formed in areas where the cell gap-maintaining columnar layer portions are formed, and the color-superimposed layers are not formed in areas where the hole-filling columnar layer portions are formed, and top surfaces of the hole-filling columnar layer portions are exposed to the liquid crystal layer.

2. The liquid crystal panel according to claim 1, wherein the cell gap-maintaining columnar layer portions are formed in a predetermined number of the recesses to fill the predetermined number of the recesses, and maintain the cell gap between the thin film transistor substrate and the counter substrate at respective locations of the predetermined number of the recesses, and wherein the hole-filling columnar layer portions fill ones of the recesses other than the predetermined number of the recesses.

3. The liquid crystal panel according to claim 1, wherein the color-superimposed layers comprises three color filter layers.

4. A method of manufacturing a liquid crystal panel including a thin film transistor substrate formed with thin film transistors for driving pixel electrodes, a counter substrate provided in a manner opposed to the thin film transistor substrate, and a liquid crystal layer sandwiched between the thin film transistor substrate and the counter substrate, the method comprising the step of simultaneously forming hole-filling columnar layer portions for filling recesses produced by forming the pixel electrodes in contact holes each formed for connecting each of the thin film transistors and an associated one of the pixel electrodes to each other, and cell gap-maintaining columnar layer portions for maintaining a cell gap between the thin film transistor substrate and the counter substrate, wherein the hole-filling columnar layer portions are formed so that respective heights of the hole-filling columnar layer portions are larger than respective depths of the contact holes, and wherein color-superimposed layers consisting of color filter layers are formed in areas where the cell gap-maintaining columnar layer portions are formed, and the color-superimposed layers are not formed in areas where the hole-filling columnar layer portions are formed, and top surfaces of the hole-filling columnar layer portions are exposed to the liquid crystal layer.

5. The method according to claim 4, wherein the step of simultaneously forming hole-filling columnar layer portions for filling recesses produced by forming the pixel electrodes in contact holes each formed for connecting each of the thin film transistors and an associated one of the pixel electrodes to each other, and cell gap-maintaining columnar layer portions for maintaining a cell gap between the thin film transistor substrate and the counter substrate includes exposing a photosensitive resin formed on an entire surface of the thin film transistor substrate to light, to leave behind areas for forming the hole-filling columnar layer portions therein, and areas for forming the cell gap-maintaining columnar layer portions therein, for simultaneous formation of the hole-filling columnar layer portions and the cell gap-maintaining columnar layer portions, which are made of the photosensitive resin.

6. The method according to claim 4, including the step of forming one color filter layer on the thin film transistor substrate or the counter substrate, and laminating another color filter on the one color filter layer at areas corresponding to associated ones of the areas for forming the cell gap-maintaining columnar layer portions.

7. The method according to claim 4, wherein the color-superimposed layers comprises three color filter layers.

8. A liquid crystal panel including a thin film transistor substrate formed with thin film transistors for driving pixel electrodes, a counter substrate provided in a manner opposed to the thin film transistor substrate, and a liquid crystal layer sandwiched between the thin film transistor substrate and the counter substrate, the liquid crystal panel comprising:

hole-filling columnar layer portions for filling recesses produced by forming the pixel electrodes in contact holes each formed for connecting each of the thin film transistors and an associated one of the pixel electrodes to each other, wherein respective heights of the hole-filling columnar layer portions are larger than respective depths of the contact holes, and wherein color-superimposed layers consisting of color filter layers are formed in areas where the hole-filling columnar layer portions are formed, and one of the color-superimposed layers is in direct contact with each of the hole-filling columnar layer portions.

9. A liquid crystal panel including a thin film transistor substrate formed with thin film transistors for driving pixel electrodes, a counter substrate provided in a manner opposed to the thin film transistor substrate, and a liquid crystal layer sandwiched between the thin film transistor substrate and the counter substrate, the liquid crystal panel comprising:

hole-filling columnar layer portions for filling recesses produced by forming the pixel electrodes in contact holes each formed for connecting each of the thin film transistors and an associated one of the pixel electrodes to each other, and for maintaining a cell gap between the thin film transistor substrate and the counter substrate, wherein respective heights of the hole-filling columnar layer portions are larger than respective depths of the contact holes, and wherein color-superimposed layers consisting of color filter layers are formed in areas where the hole-filling columnar layer portions for maintaining the cell gap are formed, and one of the pixel electrodes is located between each of the hole-filling columnar layer portions for maintaining the cell gap and each of the color-superimposed layers.

10. The liquid crystal panel according to claim 9, further comprising an overcoat layer which separates each of the color-superimposed layers from each of the pixel electrodes.

* * * * *